United States Patent
Ha et al.

(10) Patent No.: US 6,553,859 B2
(45) Date of Patent: Apr. 29, 2003

(54) POWER SHIFT DEVICE OF TRANSMISSION FOR VEHICLE

(75) Inventors: Hurn-Kwan Ha, Kangwon-do (KR); Sung-Yong Pyo, Seoul (KR)

(73) Assignee: Mando Corporation, Kyunggi-do (KR)

( * ) Notice: Subject to any disclaimer, the term of this patent is extended or adjusted under 35 U.S.C. 154(b) by 0 days.

(21) Appl. No.: 09/837,595

(22) Filed: Apr. 18, 2001

(65) Prior Publication Data

US 2002/0124674 A1 Sep. 12, 2002

(30) Foreign Application Priority Data

Mar. 6, 2001 (KR) .......................................... 2001-11427
Mar. 6, 2001 (KR) .......................................... 2001-11545

(51) Int. Cl.[7] .............................. F16H 3/00; F16H 59/04
(52) U.S. Cl. .................................... 74/473.3; 74/473.34
(58) Field of Search .............................. 74/473.1, 473.3, 74/473.34

(56) References Cited

U.S. PATENT DOCUMENTS

| | | | | |
|---|---|---|---|---|
| 1,721,672 A | * | 7/1929 | Schmidt | 74/473.3 |
| 1,844,292 A | * | 2/1932 | Matthews et al. | 74/473.3 |
| 2,094,976 A | * | 10/1937 | Bachman | 74/473.1 |
| 2,399,613 A | * | 5/1946 | Backus et al. | 74/473.3 |
| 2,517,871 A | * | 8/1950 | Gustafson | 74/473.1 |
| 3,550,467 A | * | 12/1970 | Forichon | 74/473.34 |
| 3,613,474 A | * | 10/1971 | Baumgartl | 74/473.3 |
| 3,645,145 A | * | 2/1972 | Galas | 74/473.1 |
| 3,757,884 A | * | 9/1973 | Tomita et al. | 74/473.3 |
| 4,335,623 A | | 6/1982 | Kronstadt | |
| 4,348,915 A | * | 9/1982 | Leitermann et al. | 74/473.3 |
| 4,377,951 A | | 3/1983 | Magg et al. | |
| 4,507,980 A | * | 4/1985 | Nishiyama et al. | 74/473.3 |
| 4,509,384 A | * | 4/1985 | Lamy et al. | 74/473.1 |
| 4,872,361 A | * | 10/1989 | Muller | 74/473.1 |
| 5,259,263 A | * | 11/1993 | Lyckberg | 74/473.1 |
| 5,813,285 A | * | 9/1998 | Niimi | 74/473.3 |
| 5,850,760 A | | 12/1998 | Jin et al. | |

FOREIGN PATENT DOCUMENTS

JP      2220961      9/1990

* cited by examiner

Primary Examiner—Thomas R. Hannon
Assistant Examiner—Colby Hansen
(74) Attorney, Agent, or Firm—R. Neil Sudol; Henry Coleman; William Sapone

(57) ABSTRACT

The present invention relates to a power shift device of a transmission for a vehicle which includes a connection link installed between a transmission lever and a power shift for transferring a select and shift operations of the transmission lever to the transmission through the power shift in such a manner that the connection link is rotated in the radius direction when the select operation of the transmission lever is performed, and is forwardly and backwardly moved in the axial direction when the shift operation of the transmission lever is performed.

2 Claims, 5 Drawing Sheets

POWER SHIFT DEVICE OF TRANSMISSION FOR VEHICLE

BACKGROUND OF THE INVENTION

1. Field of the Invention

The present invention relates to a power shift device of a transmission for a vehicle, and in particular to a power shift device of a transmission for a vehicle which is capable of operating both a select and shift using one link for thereby simplifying the construction of the system.

2. Description of the Conventional Art

Generally, a transmission lever is moved in a horizontal and vertical direction by a driver and is connected with a transmission.

When the transmission lever is moved in the horizontal direction, i.e., perpendicularly to a longitudinal axis of the vehicle, a select operation is performed, in which a load is relatively small because there is no connection between transmission gears.

When the transmission lever is moved in the vertical direction, i.e., parallel to the longitudinal axis of the vehicle, a shift operation is performed, in which a load is relatively high because a connection and a disconnection are made between the transmission gears.

At this time, a power shift is installed in such a manner that a distributing force is applied during a shift operation in which a load is high.

Namely, in the power shift, the gears of the transmission are operated by providing a distributing force to a transmission lever which is manually operated using a hydraulic force, pneumatic force and electricity.

FIG. 1 is a perspective view illustrating a conventional transmission for a vehicle. As shown therein, a manual transmission 10 which is operated manually is provided. An output terminal of a power shift 20 is connected with one side of a transmission 10.

At this time, a shift control link 30 is installed between an input terminal of the power shift 20 and the transmission lever.

In addition, a select control link 31 is installed between the manual transmission 10 and the transmission lever 40.

Therefore, the power shift 20 is operated in such a manner that the shift control link 30 is pushed and pulled by forwardly pushing or backwardly pulling the transmission lever.

At this time, since the gear of the transmission 10 is transmitted using a distributing force generated by the power shift 20, so that a driver easily performs a gear transmission using a smaller force.

Since the transmission lever 40 is operated in the vertical direction, the select control link 31 is moved in the left and right directions for thereby performing a select operation of the transmission 10.

However, the construction of a conventional transmission for a vehicle, wherein the shift control link and select control link are operated based on the shift and select operations, is complicated. Therefore, the fabrication and installation are difficult.

SUMMARY OF THE INVENTION

Accordingly, it is an object of the present invention to provide a power shift device of a transmission for a vehicle which is capable of operating both a select and shift using one link for thereby implementing a simple fabrication and installation.

In order to achieve the above object, there is provided a power shift device of a transmission for a vehicle which includes a connection link installed between a transmission lever and a power shift for transferring a select and shift operations of the transmission lever to the transmission through the power shift in such a manner that the connection link is rotated in the radius direction when the select operation of the transmission lever is performed, and is forwardly and backwardly moved in the axial direction when the shift operation of the transmission lever is performed.

BRIEF DESCRIPTION OF THE DRAWINGS

The present invention will become more fully understood from the detailed description given hereinbelow accompanying drawings which are given by way of illustration only, and this are not limitative of the present invention, and wherein.

DETAILED DESCRIPTION OF THE INVENTION

The preferred embodiments of the present invention will be described with reference to the accompanying drawings.

Figure 1:
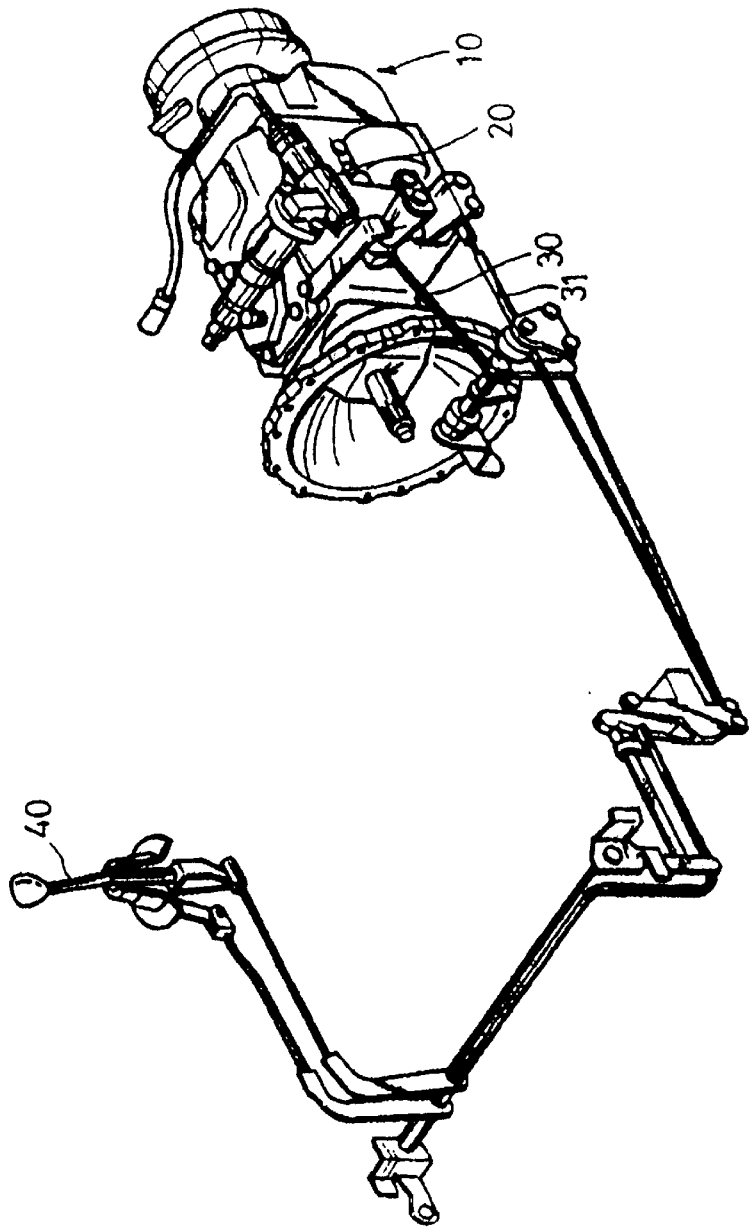
FIG. 1 is a perspective view illustrating a connection structure of a conventional vehicle transmission.
Figure 2:
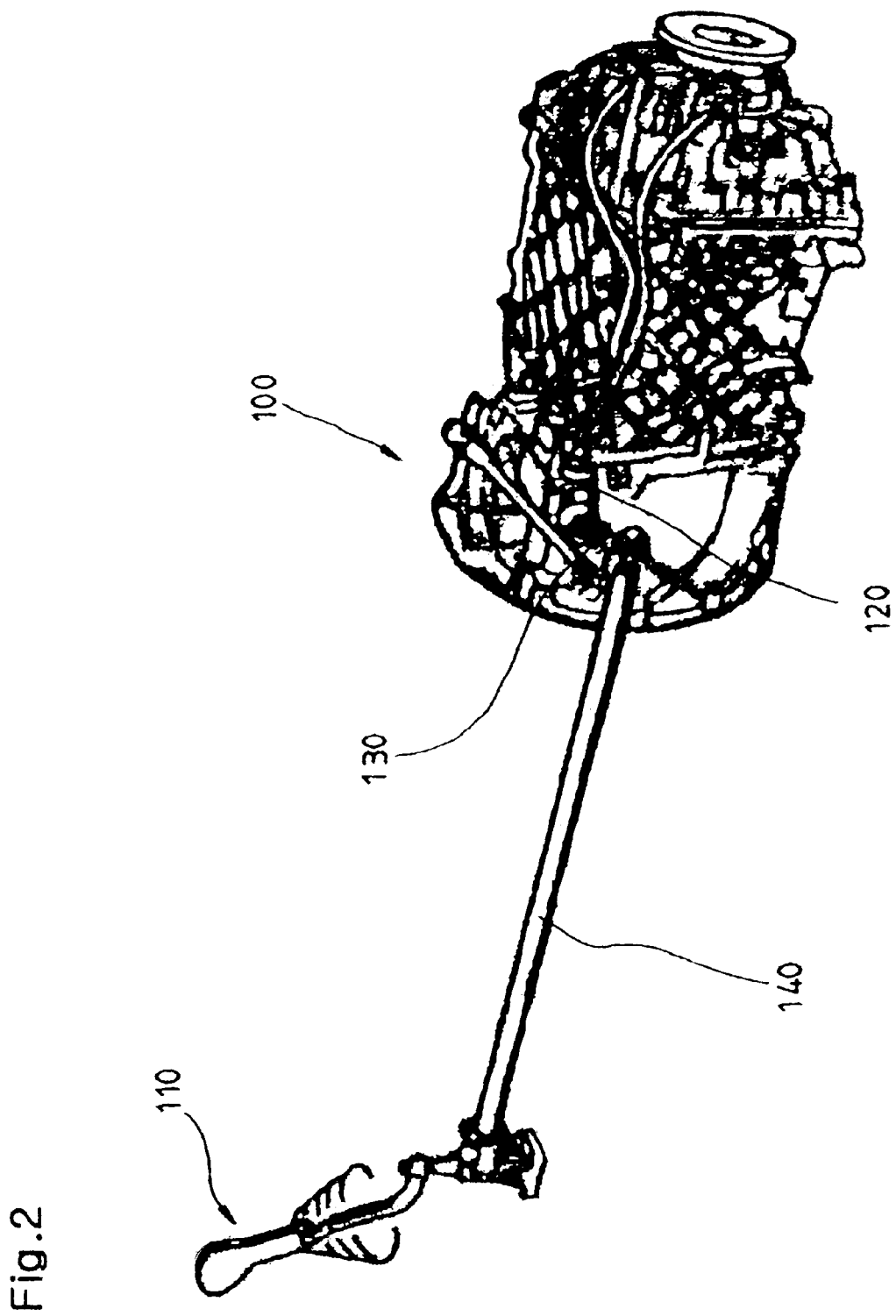
FIG. 2 is a perspective view illustrating a connection structure of a vehicle transmission according to the present invention.

FIG. 2 is a perspective view illustrating a connection structure of a vehicle transmission according to the present invention. As shown therein, a power shift 120 is installed in a transmission 100. An input rod 130 is installed near a power shift 120.

In addition, a connection link 140 is installed between a transmission lever 110 provided near a driver and an input rod 130 for being operated based on a select and shift operation of the transmission lever 110.

Namely, in the present invention, one connection link 140 and an input rod 130 are installed for implementing a simple connection structure when transferring a select and shift operation of the transmission lever 110 to the power shift 120. At this time, the connection between the connection link 140 and the input rod 130 is implemented in such a manner that the input rod 130 is moved in the axial direction when the connection link 140 is rotated, and the input rod 130 is operated in the axial direction when the connection link 140 is moved in the axial direction.

Figure 3:
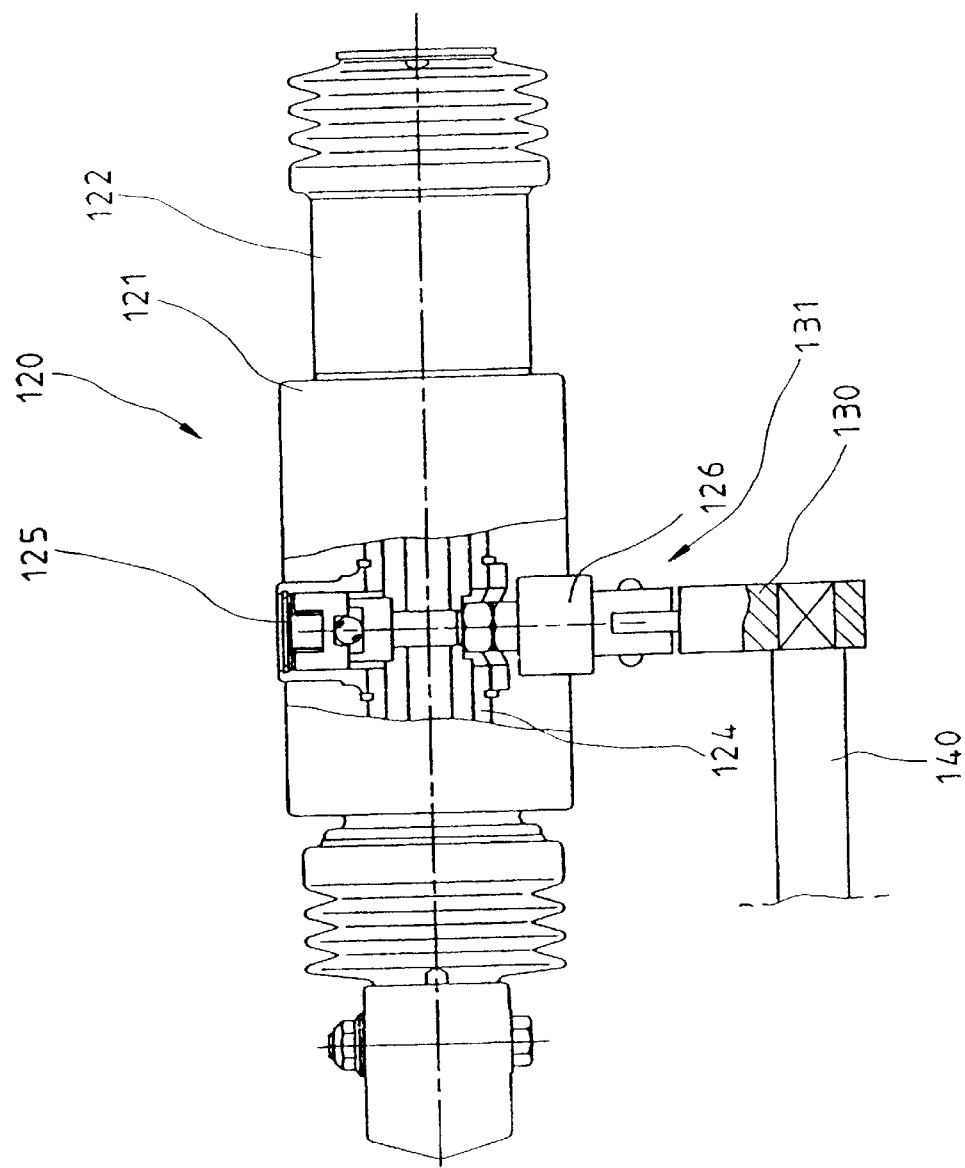
FIG. 3 is a plan view illustrating a power shift according to the present invention.
Figure 4:
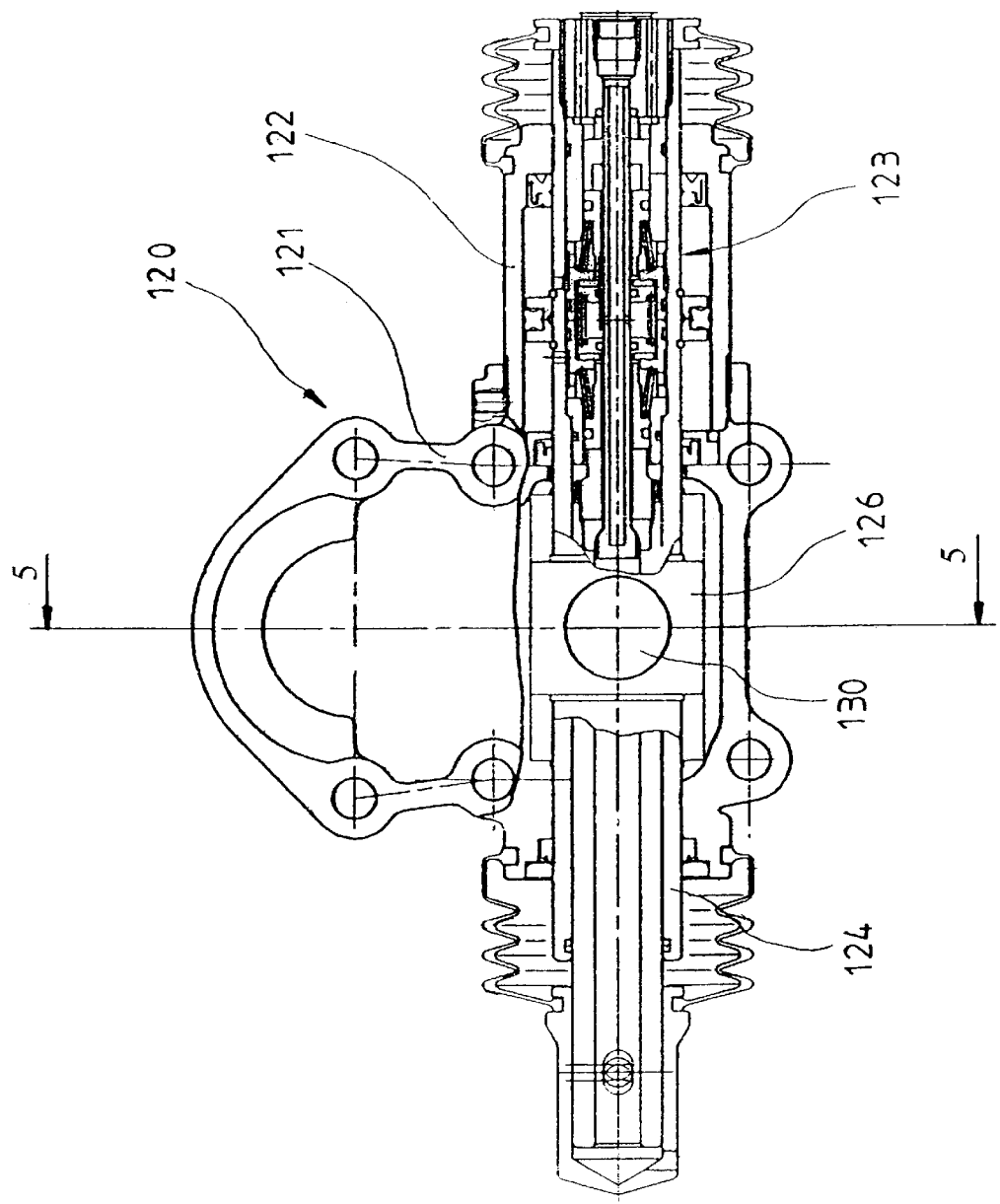
FIG. 4 is a front view illustrating a power shift according to the present invention.
Figure 5:
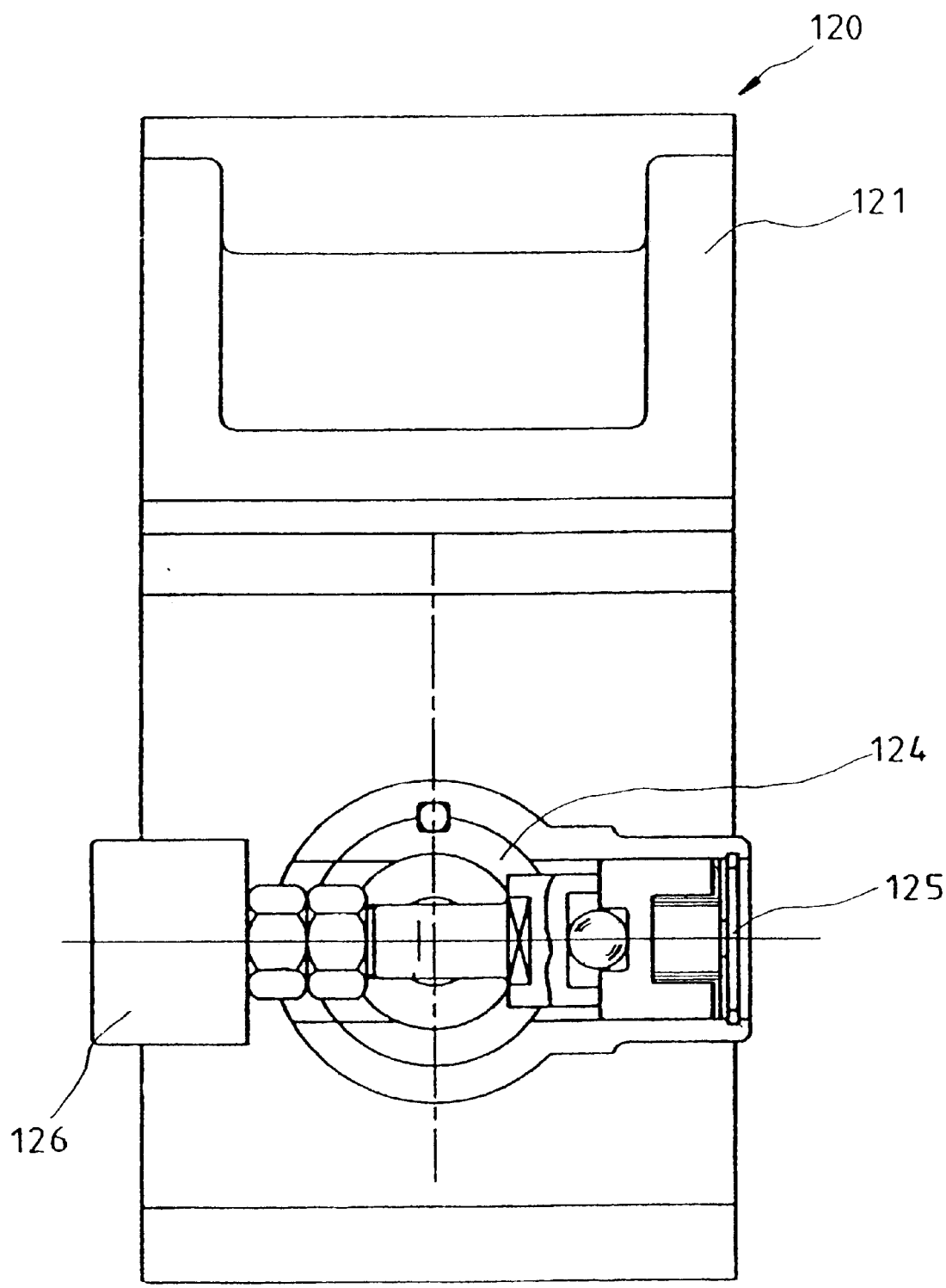
FIG. 5 is a cross-sectional view taken along line 5—5 in FIG. 4.

FIG. 3 is a plan view illustrating a power shift according to the present invention. FIG. 4 is a front view illustrating a power shift according to the present invention. FIG. 5 is a cross-sectional view taken along line 5—5 of FIG. 4.

As shown therein, in the power shift according to the present invention, a housing 121 includes both sides which are opened. In the housing 121, a cylinder 122 is installed in both opened directions.

In addition, a shift rod 124 is movable in the axial direction in the interior of the cylinder 122. A striker 125 is installed in such a manner that an output rod (not shown) is arranged across the shift rod 124 at an intermediate portion of the shift rod 124.

A connection portion 126 is formed in a portion opposite to the striker 125. An input rod 130 is installed in the interior of the connection portion 126 in such a manner that the input rod 130 is arranged across the shift rod 124.

At this time, the input rod 130 is installed between the shift rod 124 which is parallel with respect to the connection link 140 in such a manner that the input rod 130 is arranged across the shift rod 124 and is opposite to the striker 125.

A knuckle 131 is installed at an intermediate portion of the input rod 130. The knuckle 131 is not operated when the connection link 140 is moved in the axial direction. The knuckle 131 is operated when the input rod 130 is moved in the axial direction.

Namely, the input rod 130 and the shift rod 124 are operated in the same directions when the connection link 140 is moved in the axial direction, and when the connection link 140 is rotated about its axis, the knuckle 131 is operated, and the striker 125 is operated.

A distributing force portion 123 is formed at one side of the housing 121 for implementing a movement of the shift rod 124 and helps the shift rod 124 when the shift rod 124 is moved using a force transferred through the input rod 130.

The operation of the power shift device of a transmission for a vehicle according to the present invention will be described with reference to the accompanying drawings.

The input rod 130 and the shift rod 124 are arranged across for implementing an operation of the power shift 120, and the shift rod 124 and the striker 125 are arranged across.

In the above state, when a driver operates the transmission lever 110, the connection link 140 and the input rod 130 connected therewith are operated, and the input rod 130 transfers a select operation to the striker 125 and a shift operation to the shift rod 124.

Namely, in the shift operation, the connection link 140 is moved in the axial direction, and the input rod 130 is operated in the axial direction of the connection link 140, so that the shift rod 124 is operated in the axial direction.

In addition, in the select operation, the connection link 140 is rotated about its longitudinal axis, and the input rod 130 is moved in its axial direction, perpendicularly to the shift rod 124 and the connection link 140, for thereby operating the oppositely disposed striker 125.

As described above, in the power shift device of a transmission for a vehicle according to the present invention, it is possible to operate a shift and select operation using one link, so that the construction of the system is simple, and the fabrication and installation are easy.

What is claimed is:

1. In a vehicle transmission which includes a transmission lever by which a select operation in left and right directions and a shift operation in front and back directions are implemented, the transmission capable of transmitting a driving force inputted based on an operation of the transmission lever and a power shift installed on one side of the transmission for generating a certain distributing force when the transmission lever is operated, a power shift device for the transmission, comprising:

a connection link installed between the transmission lever and the power shift for transferring the select and shift operations of the transmission lever to the transmission through the power shift in such a manner that the connection link is rotated about a longitudinal axis when the select operation of the transmission lever is performed, and is forwardly and backwardly moved in the axial direction when the shift operation of the transmission lever is performed;

a shift rod arranged in a direction parallel to the connection link;

a striker disposed on a side of the shift rod opposite the connection link; and an input rod having one end connected to the connection link and the other end connected to the striker for thereby axially operating the strike and the shift rod, the input rod including a knuckle at an intermediate portion for thereby operating the striker with a movement transverse to the connection link and the shift rod when the connection link is rotated and co-operating the connection link and the shift rod in the axial direction when the connection link is forwardly or backwardly moved.

2. In a vehicle transmission which includes a transmission lever by which a select operation in left and right directions and a shift operation in front and back directions are implemented, the transmission capable of transmitting a driving force inputted based on an operation of the transmission lever and a power shift installed on one side of the transmission for generating a certain distributing force when the transmission lever is operated, a power shift device for the transmission, comprising:

a connection link installed between the transmission lever and the power shift for transferring the select and shift operations of the transmission lever to the transmission through the power shift in such a manner that the connection link is rotated about a longitudinal axis when the select operation of the transmission lever is performed, and is forwardly and backwardly moved in the axial direction when the shift operation of the transmission lever is performed;

a shift rod arranged in a direction parallel to the connection link;

a striker disposed on a side of the shift rod opposite the connection link; and an input rod having one end connected to the connection link and the other end connected to the striker for axially moving the strike and the shift rod, said input rod including a knuckle at an intermediate portion for converting a rotation of said connection link into a translation of said input rod in a direction perpendicular to said connection link and said shift rod, thereby effectuating a select operation on said striker.

* * * * *